United States Patent
You et al.

(10) Patent No.: US 7,532,641 B2
(45) Date of Patent: May 12, 2009

(54) METHOD FOR DYNAMIC ALLOCATION OF SLOT BANDWIDTH ON A SWITCH

(75) Inventors: Xuejun You, Shenzhen (CN);
Hanguang Sun, Shenzhen (CN);
Jianming Ding, Shenzhen (CN);
Zhisong Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 928 days.

(21) Appl. No.: 10/613,162

(22) Filed: Jul. 3, 2003

(65) Prior Publication Data
US 2004/0017827 A1 Jan. 29, 2004

(30) Foreign Application Priority Data
Jul. 18, 2002 (CN) .................. 02 1 26617

(51) Int. Cl.
*H04J 3/16* (2006.01)
(52) U.S. Cl. ..................................... 370/468
(58) Field of Classification Search .................. 370/468, 370/94, 299
See application file for complete search history.

(56) References Cited
U.S. PATENT DOCUMENTS 4,733,390 A * 3/1988 Shirakawa et al. .......... 370/461
4,763,321 A * 8/1988 Calvignac et al. ........... 370/236
6,975,613 B1 * 12/2005 Johansson .................... 370/338
2002/0163937 A1 * 11/2002 Svacek et al. ................ 370/468

* cited by examiner

*Primary Examiner*—Kevin C Harper
*Assistant Examiner*—Wanda Z Russell

(57) ABSTRACT

The invention discloses a method for dynamic allocation of slot bandwidth on a switch. First, the method sets that number of slots for dynamic allocation bandwidth is N and bandwidth needed to be dynamically allocated is B. Secondly; the method defines a minimum allocated bandwidth unit being ΔB, according to requirement. Then, the method sets B/ΔB pieces of N-selected-one devices on main switch board. Further, the method allocates the bandwidth B to all N-selected-one devices on the main switch board, and makes input bandwidth of every N-selected-one device being N*ΔB. Finally, the method outputs strobe signal from a control logic chip to control said N-selected-one device, and bandwidth is allocated to the slot. The method, proposed by the invention, makes that bandwidth from service processing board slot to the main switch board can be dynamically allocated, and bandwidth allocated to each slot is flexible. This high efficiency allocation guarantees that without service blocking, service ports can be flexibly allocated and the valuable upstream bandwidth can be thoroughly used.

9 Claims, 2 Drawing Sheets

METHOD FOR DYNAMIC ALLOCATION OF SLOT BANDWIDTH ON A SWITCH

CROSS-REFERENCE TO RELATED APPLICATIONS

This application claims the benefit of Chinese Patent Application No. 02126617.4 filed Jul. 18, 2002. The disclosure of the above application is incorporated herein by reference.

FIELD OF THE INVENTION

The present invention relates to telecommunication field, and more particularly to a dynamic allocation method for bandwidth of slot on a switch.

BACKGROUND OF THE INVENTION

In switch design, sometimes slot structure is used. In the past design, the number of slots and the line flow from a slot to the main switch board are fixed. In this way, flexibility of bandwidth allocation is limited at the hardware. For example, if a broad bandwidth slot is plugged with a service processing board that has lower requirement of data bandwidth, then bandwidth resource is wasted.

FIG. 1 shows a slot diagram of a switch. There are four slots in total, and each slot is designed with upstream bandwidth 8G. Therefore, each of the four slots can be respectively plugged in a service processing board with upstream bandwidth 8G, for example this service processing board supports 8 gigabit Ethernet. If a Ethernet process board with 3G upstream bandwidth is intended to be plugged in one of the slots, for example this board supports thirty 100M Ethernet, the bandwidth of this slot is wasted. In this case only 3G upstream bandwidth is used, however another 5G upstream bandwidth is wasted.

If using two slots having 4G upstream bandwidth substitutes as one slot of the original four slots with 8G upstream bandwidth, two Ethernet process boards each support a plurality of 100M Ethernets can be plugged in the switch. Nevertheless, there are only three slots are available for service processing board with 8G bandwidth. If a service processing board with 8G bandwidth is plugged in the slot with upstream bandwidth 4G, it will cause 50% service flow to be blocked. In some cases, this design is forbidden.

SUMMARY OF THE INVENTION

Object of the invention is to overcome the present technology shortcomings that makes allocation upstream bandwidth inflexible. The invention proposes a method for dynamic allocation of slot bandwidth on a switch. This dynamic allocation of slot bandwidth method not only can provide unblock service to a larger flow service processing board but also can allocate upstream bandwidth to more slots to support multiple lower flow service processing boards to avoid bandwidth waste.

The method for dynamic allocation of slot bandwidth on a switch comprises the following steps:

setting $B/\Delta B$ pieces of N-selected-one devices, and the input bandwidth of the N-selected-one device being $N*\Delta B$; wherein N denotes the number of slots for dynamic bandwidth allocation, B denotes bandwidth need to be dynamically allocated; and $\Delta B$ denotes a minimum allocated bandwidth unit;

connecting each slot with one input of each N-selected-one device, and connecting all output of the N-selected-one devices with a main switch module;

controlling the N-selected-one device being gated to allocate the bandwidth to slot.

According to an embodiment of the present invention, an apparatus for dynamic allocation of slot bandwidth includes:

N slots, wherein N denotes the number of slots for dynamic bandwidth allocation;

$B/\Delta B$ pieces of N-selected-one devices, input bandwidth of every N-selected-one device being $N*\Delta B$; wherein B denotes bandwidth need to be dynamically allocated; and $\Delta B$ denotes a minimum allocated bandwidth unit; N inputs of each N-selected-one device are connected with the N slots respectively, and an output of each N-selected-one device is connected with a main switch module;

the main switch module, arranged to control the N-selected-one devices being gated to allocate the bandwidth to gated slot.

According to another embodiment of the present invention, an apparatus for dynamic allocation of slot bandwidth includes:

two slots;

$B/\Delta B$ pieces of two-selected-one devices, input bandwidth of every two-selected-one device being $2*\Delta B$; wherein B denotes bandwidth need to be dynamically allocated; and $\Delta B$ denotes a minimum allocated bandwidth unit; two inputs of each two-selected-one device are connected with the two slots respectively, and an output of each two-selected-one device is connected with a main switch module;

the main switch module, arranged to control the two-selected-one devices being gated to allocate the bandwidth to gated slot.

Therefore, the total bandwidth B can be freely allocated to N slots. Repeatedly using the method, any allocation scheme can be flexibly implemented.

The method for dynamic allocation of slot bandwidth on a switch, proposed by the invention, allocates the bandwidth to several slots, and each slot has less bandwidth. The advantage is more service processing boards with small flow can be plugged-in, or when a block happens, more service ports can be provided. By this method the bandwidth from slot to the main switch board can be dynamically configured, i.e., the upstream bandwidth allocated to each slot is flexible. This high efficiency allocation provides service ports configuration as flexible as possible to make full use of upstream bandwidth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
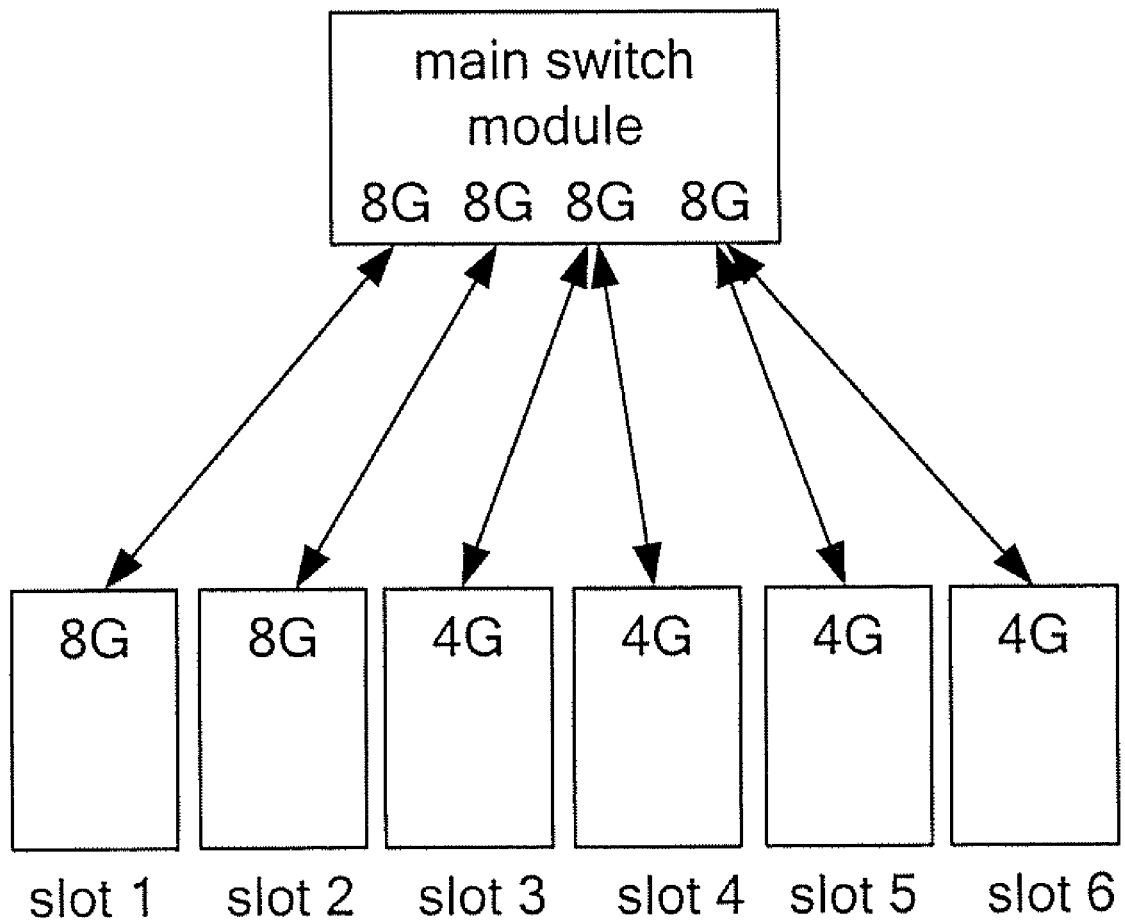
FIG. 1 shows a fixed allocation diagram of upstream bandwidth of present technique.
Figure 2:
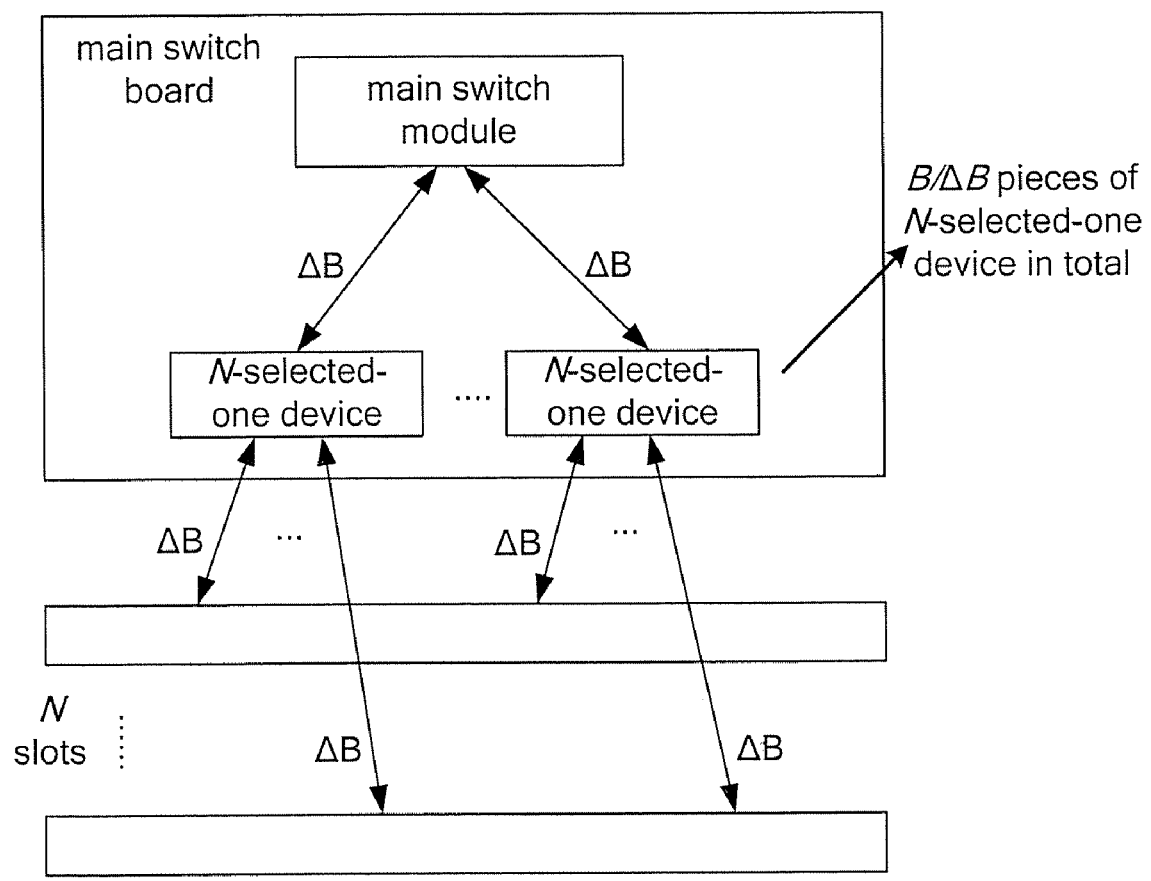
FIG. 2 shows a dynamic allocation diagram of upstream bandwidth of the invention.

Principle of the invention, a dynamic upstream bandwidth allocation method for slots on a switch, is shown on FIG. 2. Suppose there are N slots for dynamic allocation of upstream bandwidth, and the available upstream bandwidth is B. The minimum upstream bandwidth unit for allocating is $\Delta B$. On the main switch board, $B/\Delta B$ pieces of N-selected-one device are set. Input bandwidth of every N-selected-one device is $N*\Delta B$, i.e., a $\Delta B$ bandwidth is allocated to every input of the N-selected-one device. Each of the N slots is connected to all N-selected-one devices of the main switch board, i.e., each slot is connected with one input of each N-selected-one device, and all output of the N-selected-one devices is connected with a main switch module. There is a programmable logic chip controlled by CPU on the main switch board. The programmable logic chip outputs strobe signals to control the N-selected-one device, and to allocate bandwidth to the slot according to requirement.

Using the method mentioned above, the total upstream bandwidth B can be freely allocated to N slots. Repeatedly using the above method, any allocation scheme can be flexibly implemented.

An embodiment of the invention is as follows. Suppose there are two slots for dynamic allocation, and the upstream bandwidth to be allocated is 4G, i.e., B=4G. The minimum unit of allocated upstream bandwidth is $\Delta B$=2G. Two-selected-one device can be used on the main switch board, and the number of the devices is $B/\Delta B$=4/2=2. Therefore, two two-selected-one devices are used, and every input bandwidth of the devices is 2G. Consequently, upstream bandwidth 4G can be flexibly allocated between these two slots. In this embodiment, the two-selected-one device is type VSC713YB, made by VITESSE Company, which is a 1.25 GHz Ethernet signal driver, and the logic control chip is an EPLD programmable logic chip with type EPM7256AEQ208-10, made by ALTERA Company.

According to different requirement, the invention method can use three-selected-one device or four-selected-one device etc. to flexibly form different bandwidth allocation schemes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for dynamic allocation of slot bandwidth on a switch, comprising:

providing $B/\Delta B$ pieces of N-selected-one devices, input bandwidth of every N-selected-one device being $N*\Delta B$, N denoting the number of slots and being greater than 1 for dynamic bandwidth allocation, B denoting bandwidth need to be dynamically allocated, $\Delta B$ denoting a minimum allocated bandwidth unit;

communicating each slot with an input of each N-selected-one device, and communicating outputs of the N-selected-one devices with a main switch module;

controlling the N-selected-one devices to allocate the bandwidth to communicated slots.

2. The method according to claim 1, further comprising:

controlling, by the main switch module, a programmable logic chip to output strobe signals, and wherein the controlling the N-selected-one devices to allocate the bandwidth to communicated slots comprises controlling the N-selected-one devices by the programmable logic chip through the strobe signals.

3. The method according to claim 1, wherein the programmable logic chip is an Electrically Programmable Logical Device (EPLD) with type EPM7256AEQC208-10.

4. The method according to claim 1, wherein the N-selected-one device is a two-selected-one device.

5. The method according to claim 4, wherein the two-selected-one device is a 1.25 GHz Ethernet signal driver with type VSC7132YB.

6. An apparatus for dynamic allocation of slot bandwidth, comprising:

N slots, N denoting the number of slots and being greater than 1 for dynamic bandwidth allocation;

$B/\Delta B$ pieces of N-selected-one devices, input bandwidth of every N-selected-one device being $N*\Delta B$, B denoting bandwidth need to be dynamically allocated, $\Delta B$ denoting a minimum allocated bandwidth unit; and a main switch module, wherein N inputs of each N-selected-one device communicate with the N slots respectively, an output of each N-selected-one device communicates with the main switch module, and the main switch module communicates with the N-selected-one devices for controlling the N-selected-one devices to allocate the bandwidth to communicated slots.

7. The apparatus according to claim 6, further comprising:

a programmable logic chip controlled by the main switch module for providing strobe signals to control the N-selected-one devices.

8. The apparatus according to claim 7, wherein the programmable logic chip is an Electrically Programmable Logical Device (EPLD).

9. An apparatus for dynamic allocation of slot bandwidth, comprising:

N slots, N being an integer greater than 1;

a main switch module;

$B/\Delta B$ pieces of N-selected-one devices that each are coupled to the main switch module, wherein each of $B/\Delta B$ pieces of N-selected-one devices selectively couples each one of the N slots to the main switch module under control of the main switch module, B denoting bandwidth to be dynamically allocated, $\Delta B$ denoting a minimum allocated bandwidth unit and being no greater than a half of B; and wherein the main switch module controls each of the N-selected-one devices to select one of the N slots to be coupled to the main switch module and to allocate one $\Delta B$ bandwidth to the selected slot.

* * * * *